US011336875B2

(12) United States Patent
Yotsuya et al.

(10) Patent No.: US 11,336,875 B2
(45) Date of Patent: May 17, 2022

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Shinichi Yotsuya, Chino (JP); Tetsuo Shimizu, Matsumoto (JP); Ryuta Koizumi, Shiojiri (JP); Mizuha Hiroki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/203,845

(22) Filed: Mar. 17, 2021

(65) Prior Publication Data

US 2021/0297641 A1 Sep. 23, 2021

(30) Foreign Application Priority Data

Mar. 18, 2020 (JP) .............................. JP2020-047574

(51) Int. Cl.
*H04N 9/31* (2006.01)

(52) U.S. Cl.
CPC ......... *H04N 9/3158* (2013.01); *H04N 9/3141* (2013.01); *H04N 9/3152* (2013.01)

(58) Field of Classification Search
CPC .. H04N 9/3141; H04N 9/3158; H04N 9/3152; G02B 26/00
USPC ....... 348/744, 759, 760, 798, 799, 801, 802; 359/237, 238
See application file for complete search history.

(56) References Cited

U.S. PATENT DOCUMENTS

| | | | |
|---|---|---|---|
| 2013/0021582 A1* | 1/2013 | Fujita ................... | G03B 21/204 353/31 |
| 2014/0247429 A1 | 9/2014 | Ogino et al. | |
| 2016/0230945 A1 | 8/2016 | Inoue et al. | |
| 2017/0227176 A1 | 8/2017 | Inoue et al. | |

FOREIGN PATENT DOCUMENTS

| | | |
|---|---|---|
| JP | 2014-170037 A | 9/2014 |
| JP | 2016-031838 A | 3/2016 |
| JP | 2016-194697 A | 11/2016 |
| JP | 2017-215549 A | 12/2017 |

* cited by examiner

*Primary Examiner* — Sherrie Hsia
(74) *Attorney, Agent, or Firm* — Oliff PLC

(57) ABSTRACT

The wavelength conversion element according to the present disclosure includes a wavelength conversion layer which has a first surface and a second surface different from the first surface, and which includes a scattering element no higher than 5% in volume ratio, and which is configured to convert light in a first wavelength band into light in a second wavelength band different from the first wavelength band, and a plurality of protruding parts which is disposed so as to be opposed to the first surface, and which includes a first protruding part and a second protruding part adjacent to each other. A height of the plurality of protruding parts is no smaller than 1 μm, and a distance between a vertex of the first protruding part and a vertex of the second protruding part in a direction along the first surface is no smaller than 3 μm.

8 Claims, 8 Drawing Sheets

WAVELENGTH CONVERSION ELEMENT, LIGHT SOURCE DEVICE, AND PROJECTOR

The present application is based on, and claims priority from JP Application Serial Number 2020-047574, filed Mar. 18, 2020, the disclosure of which is hereby incorporated by reference herein in its entirety.

BACKGROUND

1. Technical Field

The present disclosure relates to a wavelength conversion element, a light source device, and a projector.

2. Related Art

As a light source device used for a projector, there is proposed a light source device using fluorescence emitted from a phosphor when irradiating the phosphor with excitation light emitted from a light emitting element. In JP-A-2017-215549 (Document 1), there is disclosed a wavelength conversion element having a first reflecting layer, a wavelength conversion layer, a second reflecting layer, and a light scattering layer stacked on one surface of a substrate in this order from the substrate side.

In the wavelength conversion element in Document 1, closer to the incident side of the excitation light than the wavelength conversion layer, there is disposed the second reflecting layer having a property of transmitting a part of the excitation light, reflecting another part of the excitation light, and transmitting fluorescence. Therefore, white light obtained by combining blue light as another part of the excitation light reflected by the second reflecting layer, and yellow light as the fluorescence generated in the wavelength conversion layer with each other is emitted from the wavelength conversion element.

As described above, in the wavelength conversion element in Document 1, since a part of the excitation light is reflected by the second reflecting layer to generate the white light, a part of the excitation light is transmitted through the second reflecting layer to reach the wavelength conversion layer. Therefore, in order to increase the wavelength conversion efficiency of the excitation light having reached the wavelength conversion layer, it is desirable to use the wavelength conversion layer including little scattering elements so as to decrease the chance for a loss of the excitation light to occur as small as possible. However, when using the wavelength conversion layer including little scattering elements, it is difficult to extract the fluorescence generated in the wavelength conversion layer, and there is a possibility that the use efficiency of the fluorescence decreases.

SUMMARY

To solve of the problems described above, a wavelength conversion element according to an aspect of the present disclosure includes a wavelength conversion layer which has a first surface and a second surface different from the first surface, and which includes a scattering element no higher than 5% in volume ratio, and which is configured to convert light in a first wavelength band into light in a second wavelength band different from the first wavelength band, and a plurality of protruding parts which is disposed so as to be opposed to the first surface, and which includes a first protruding part and a second protruding part adjacent to each other, wherein a height of the plurality of protruding parts is no smaller than 1 µm, and a distance between a vertex of the first protruding part and a vertex of the second protruding part in a direction along the first surface is no smaller than 3 µm.

A light source device according to another aspect of the present disclosure includes the wavelength conversion element according to the aspect of the present disclosure, and a light source configured to emit the light in the first wavelength band.

A projector according to another aspect of the present disclosure includes the light source device according to the aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

An embodiment of the present disclosure will hereinafter be described using FIG. 1 through FIG. 3.

It should be noted that in each of the drawings described below, the constituents are shown with the scale ratios of respective sizes set differently between the constituents in some cases in order to facilitate the visualization of each of the constituents.

An example of a projector according to the present embodiment will be described.

Figure 1:
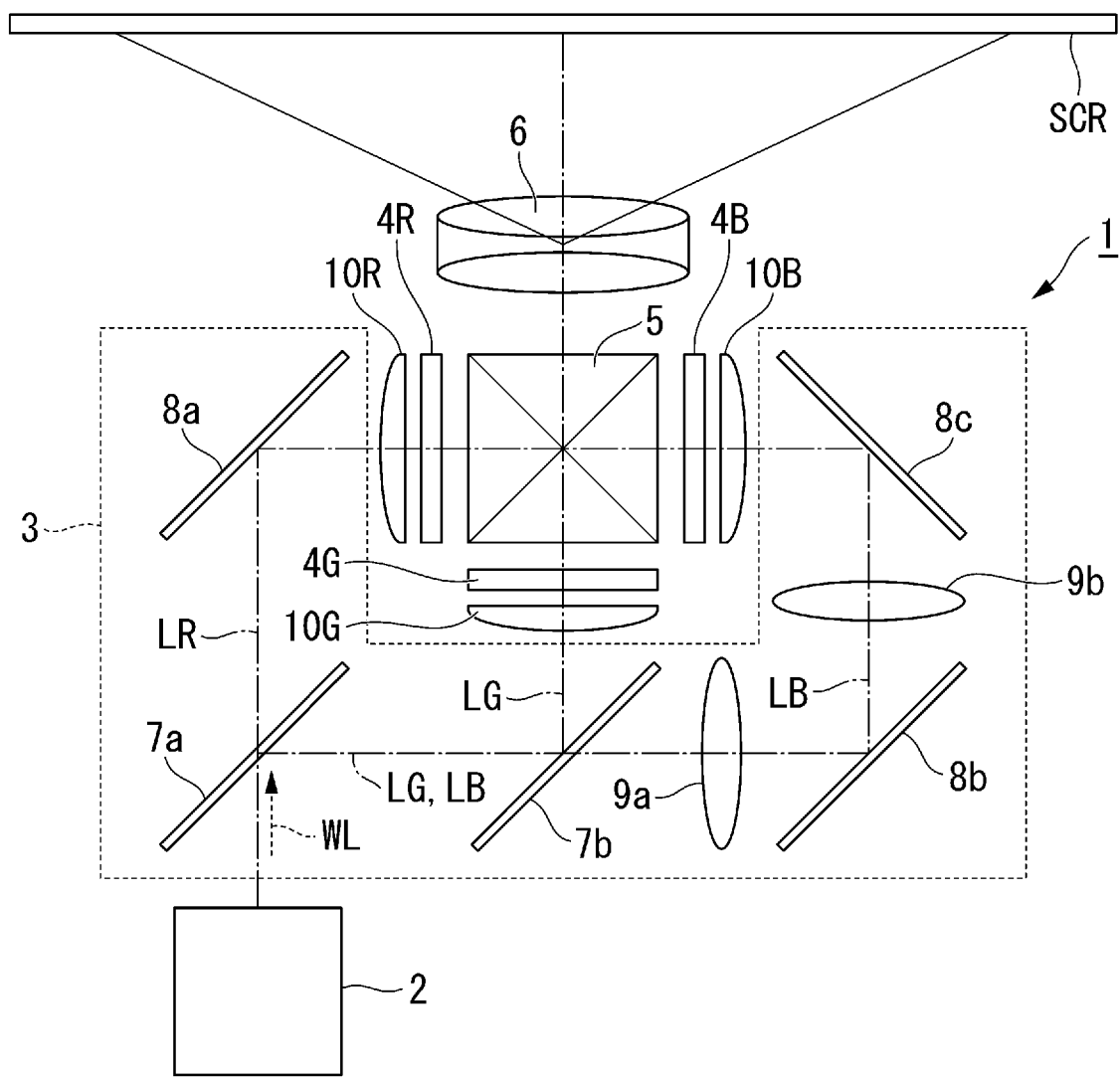
FIG. 1 is a schematic configuration diagram of a projector according to a first embodiment.

FIG. 1 is a schematic configuration diagram of a projector 1 according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. The configuration of the illumination device 2 will be described later in detail.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates illumination light WL emitted from the illumination device 2 into red light LR, green light LG, and blue light LB, and then guides the red light LR to the light modulation device 4R, guides the green light LG to the light modulation device 4G, and guides the blue light LB to the light modulation device 4B.

A field lens 10R is disposed between the color separation optical system 3 and the light modulation device 4R, and substantially collimates the incident light and then emits the result toward the light modulation device 4R. A field lens 10G is disposed between the color separation optical system 3 and the light modulation device 4G, and substantially collimates the incident light and then emits the result toward the light modulation device 4G. A field lens 10B is disposed between the color separation optical system 3 and the light modulation device 4B, and substantially collimates the incident light and then emits the result toward the light modulation device 4B.

The first dichroic mirror 7a transmits a red light component, and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR having been transmitted through the first dichroic mirror 7a is reflected by the reflecting mirror 8a, and is then transmitted through the field lens 10R to enter an image forming area of the light modulation device 4R for the red light. The green light LG having been reflected by the first dichroic mirror 7a is further reflected by the second dichroic mirror 7b, and then transmitted through the field lens 10G to enter an image forming area of the light modulation device 4G for the green light. The blue light LB having been transmitted through the second dichroic mirror 7b enters an image forming area of the light modulation device 4B for the blue light via the relay lens 9a, the reflecting mirror 8b at the incident side, the relay lens 9b, the reflecting mirror 8c at the exit side, and the field lens 10B.

The light modulation device 4R, the light modulation device 4G, and the light modulation device 4B each modulate the colored light having entered the light modulation device in accordance with image information to thereby form image light. The light modulation device 4R, the light modulation device 4G, and the light modulation device 4B are each formed of a liquid crystal light valve. Although not shown in the drawings, at the light incident side of each of the light modulation device 4R, the light modulation device 4G, and the light modulation device 4B, there is disposed an incident side polarization plate. At the light exit side of each of the light modulation device 4R, the light modulation device 4G, and the light modulation device 4B, there is disposed an exit side polarization plate.

The combining optical system 5 combines the image light emitted from the light modulation device 4R, the image light emitted from the light modulation device 4G, and the image light emitted from the light modulation device 4B with each other to form full-color image light. The combining optical system 5 is formed of a cross dichroic prism having four rectangular prisms bonded to each other to have a substantially square shape in the plan view. On the interfaces having a substantially X shape on which the rectangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the image light emitted from the light modulation device 4R, the image light emitted from the light modulation device 4G, and the image light emitted from the light modulation device 4B. The projection optical device 6 is constituted by a plurality of projection lenses.

An example of the illumination device 2 in the present embodiment will be described.

Figure 2:
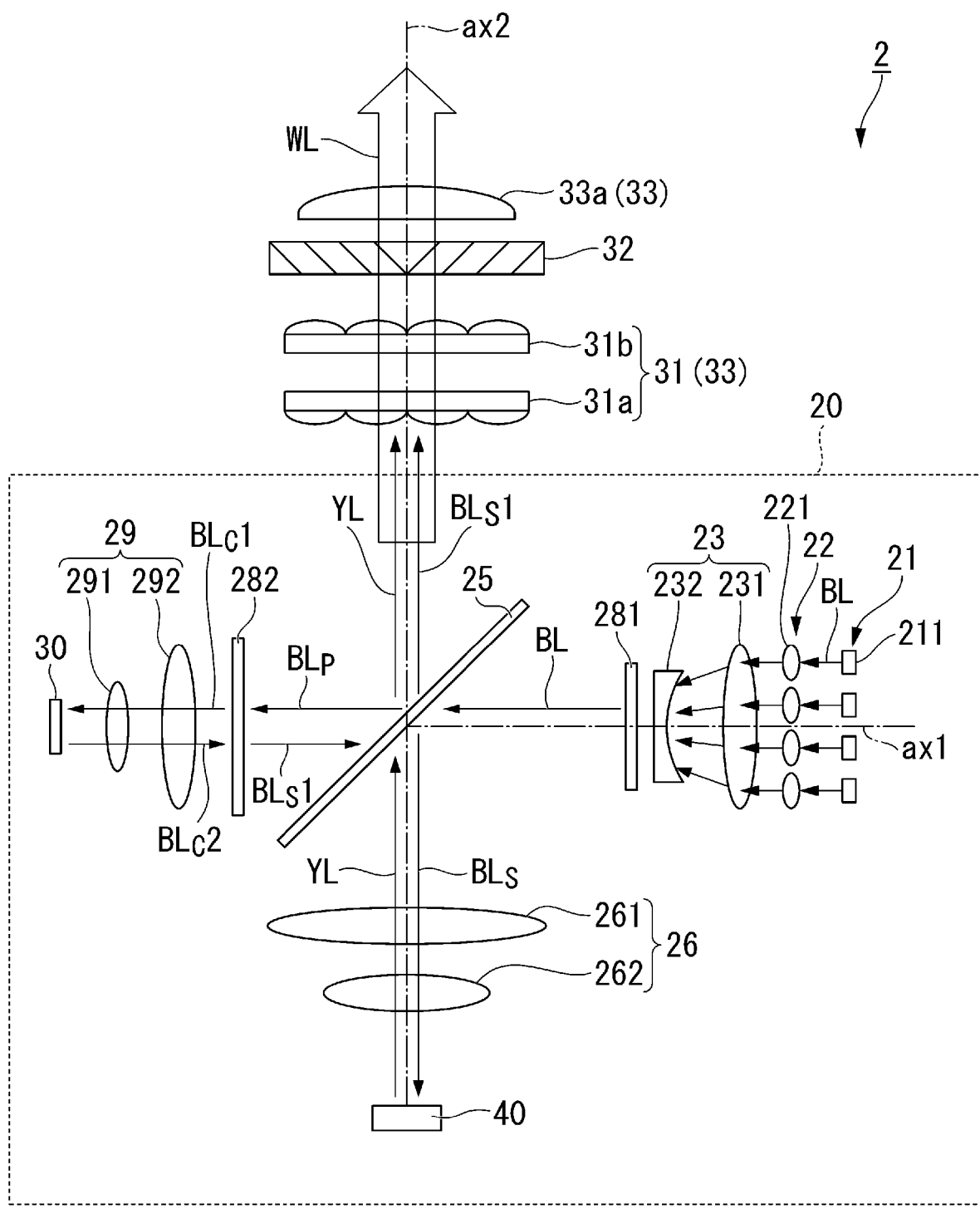
FIG. 2 is a schematic configuration diagram of an illumination device according to the first embodiment.

FIG. 2 is a schematic configuration diagram of the illumination device 2.

As shown in FIG. 2, the illumination device 2 is provided with a light source device 20, an integrator optical system 31, a polarization conversion element 32, and a superimposing lens 33a. The integrator optical system 31 and the superimposing lens 33a constitute a superimposing optical system 33.

The light source device 20 is provided with a light source section 21, a collimator optical system 22, an afocal optical system 23, a first wave plate 281, a polarization split element 25, a first light collection optical system 26, a wavelength conversion element 40, a second wave plate 282, a second light collection optical system 29, and a diffusely reflecting element 30.

Hereinafter, in FIG. 2, using an XYZ orthogonal coordinate system, an axis parallel to a principal ray of a blue light beam BL emitted from the light source section 21 is defined as an X axis, an axis parallel to a principal ray of fluorescence YL emitted from the wavelength conversion element 40 is defined as a Y axis, an axis perpendicular to the X axis and the Y axis is defined as a Z axis.

The light source section 21, the collimator optical system 22, the afocal optical system 23, the first wave plate 281, the polarization split element 25, the second wave plate 282, the second light collection optical system 29, and the diffusely reflecting element 30 are arranged side by side in series on a light axis ax1. The wavelength conversion element 40, the first light collection optical system 26, the polarization split element 25, the integrator optical system 31, the polarization conversion element 32, and the superimposing lens 33a are arranged side by side in series on a light axis ax2. The light axis ax1 and the light axis ax2 are located in the same plane, and are perpendicular to each other. The light axis ax1 is an axis extending along the principal ray of the blue light beam BL, and the light axis ax2 is an axis extending along the principal ray of the fluorescence YL.

The light source section 21 is provided with a plurality of light emitting elements 211 for emitting the excitation light. The plurality of light emitting elements 211 is arranged in an array in a plane perpendicular to the light axis ax1. In the case of the present embodiment, the light source section 21 has a configuration in which four sets of light source units each having the four light emitting elements 211 arranged in a line along the Y axis are arranged along the Z axis perpendicular to the Y axis in which the four light emitting elements 211 are arranged. In other words, the light source section 21 has a configuration having the sixteen light emitting elements 211 arranged in a 4×4 array. It should be noted that the number and the arrangement of the light emitting elements 211 are not limited to those of the configuration described above.

The light emitting elements 211 are each formed of a laser element for emitting the blue light beam BL. The laser element is formed of, for example, a semiconductor laser, and emits the light having a blue color in a first wavelength band, specifically, the blue light beam BL in the first wavelength band with a peak wavelength of, for example, 460 nm. Therefore, the light source section 21 emits a plurality of the blue light beams BL. The blue light beam BL in the present embodiment corresponds to light in the first wavelength band in the appended claims.

The blue light beams BL emitted from the light source section 21 enter the collimator optical system 22. The collimator optical system 22 converts the blue light beams BL emitted from the light source section 21 into parallel light beams. The collimator optical system 22 is constituted by a plurality of collimator lenses 221 arranged side by side in an array. Each of the collimator lenses 221 is disposed at a position which the blue light beam BL emitted from one of the light emitting elements 211 enters.

The blue light beams BL having passed through the collimator optical system 22 enter the afocal optical system 23. The afocal optical system 23 adjusts the diameter of the blue light beam BL, namely the thickness of the blue light beam BL. The afocal optical system 23 is constituted by a convex lens 231 and a concave lens 232.

The blue light beams BL having passed through the afocal optical system 23 enter the first wave plate 281. The first wave plate 281 is formed of, for example, a ½ wave plate which is made rotatable. The blue light beams BL which have just been emitted from the light source section 21 are linearly polarized light having a predetermined polarization direction. By appropriately setting the rotational angle of the first wave plate 281, it is possible to convert the blue light beams BL transmitted through the first wave plate 281 into the blue light beams BL each including an S-polarization component and a P-polarization component with respect to the polarization split element 25 at a predetermined ratio. By changing the rotational angle of the first wave plate 281, it is possible to change the ratio between the S-polarization component and the P-polarization component.

The blue light beam BL including the S-polarization component and the P-polarization component emitted from the first wave plate 281 enters the polarization split element 25. The polarization split element 25 is formed of, for example, a polarization beam splitter having wavelength selectivity. The polarization split element 25 is arranged so as to form an angle of 45° with respect to each of the light axis ax1 and the light axis ax2.

The polarization split element 25 has a polarization split function of splitting the blue light beam BL into a blue light beam BLs as the S-polarization component with respect to the polarization split element 25 and a blue light beam BLp as the P-polarization component. Specifically, the polarization split element 25 reflects the blue light beam BLs as the S-polarization component, and transmits the blue light beam BLp as the P-polarization component. Further, the polarization split element 25 has a color separation function of transmitting a yellow light component different in wavelength band from the blue light beam BL irrespective of the polarization state of the yellow light component in addition to the polarization split function.

The blue light beam BLs as the S-polarized light having been reflected by the polarization split element 25 enters the first light collection optical system. 26. The blue light beams BL emitted from the light source section 21 enter the first light collection optical system 26, and the first light collection optical system 26 converges the blue light beams BLs toward the wavelength conversion element 40. The first light collection optical system 26 is constituted by a first lens 261 and a second lens 262. The first lens 261 and the second lens 262 are each formed of a convex lens. The blue light beams BLs having been emitted from the first light collection optical system 26 enter the wavelength conversion element 40 in a converged state. The detailed configuration of the wavelength conversion element 40 will be described later.

The fluorescence YL as yellow light having been generated by the wavelength conversion element 40 is collimated by the first light collection optical system 26, and then enters the polarization split element 25. As described above, since the polarization split element 25 has a property of transmitting the yellow light component irrespective of the polarization state, the fluorescence YL is transmitted through the polarization split element 25.

Meanwhile, the blue light beams BLp as the P-polarized light having been emitted from the polarization split element 25 enter the second wave plate 282. The second wave plate 282 is formed of a ¼ wave plate disposed in the light path between the polarization split element 25 and the diffusely reflecting element 30. The blue light beam BLp as the P-polarized light having been emitted from the polarization split element 25 is converted by the second wave plate 282 into, for example, a blue light beam BLc1 as clockwise circularly polarized light, and then enters the second light collection optical system 29.

The second light collection optical system 29 is constituted by a first lens 291 and a second lens 292. The first lens 291 and the second lens 292 are each formed of a convex lens. The second light collection optical system 29 makes the blue light beam BLc1 enter the diffusely reflecting element 30 in a converged state.

The diffusely reflecting element 30 is disposed on the light path of the blue light beam BLp emitted from the polarization split element 25. The diffusely reflecting element 30 diffusely reflects the blue light beam BLc1, which has been emitted from the second light collection optical system 29, toward the polarization split element 25. It is desirable for the diffusely reflecting element 30 to reflect the blue light beam BLc1 in an angular distribution approximate to the Lambertian diffusion, and at the same time, not to disturb the polarization state of the blue light beam BLc1.

The light diffusely reflected by the diffusely reflecting element 30 is hereinafter referred to as a blue light beam BLc2. In the present embodiment, by diffusely reflecting the blue light beam BLc1, there can be obtained the blue light beam BLc2 having a substantially homogenous illuminance distribution. For example, the blue light beam BLc1 as the clockwise circularly polarized light is diffusely reflected by the diffusely reflecting element 30 to thereby be converted into the blue light beam BLc2 as the counterclockwise circularly polarized light.

The blue light beams BLc2 are converted by the second light collection optical system. 29 into a parallel pencil, and then enter the second wave plate 282 once again. The blue light beam BLc2 as the counterclockwise circularly polarized light is converted by the second wave plate 282 into a blue light beam BLs1 as S-polarized light. The blue light beam BLs1 as the S-polarized light is reflected by the polarization split element 25 toward the integrator optical system 31.

In such a manner, the blue light beams BLs1 are combined with the fluorescence YL having been transmitted through the polarization split element 25, and are used as the illumination light WL. Specifically, the blue light beams BLs1 and the fluorescence YL are emitted from the polarization split element 25 toward the respective directions the same as each other, and thus, there is generated the illumination light WL as the white light having the blue light beams BLs1 and the fluorescence YL as the yellow light combined with each other.

The illumination light WL is emitted toward the integrator optical system 31. The integrator optical system 31 is constituted by a first lens array 31a and a second lens array 31b. The first lens array 31a and the second lens array 31b each have a configuration having a plurality of lenses arranged in an array.

The illumination light WL having been transmitted through the integrator optical system 31 enters the polarization conversion element 32. The polarization conversion element 32 has a polarization split film and a wave plate not shown. The polarization conversion element 32 converts the illumination light WL including the fluorescence YL as unpolarized light into linearly polarized light which is made to enter the light modulation device 4R, the light modulation device 4G, and the light modulation device 4B.

The illumination light WL having been transmitted through the polarization conversion element 32 enters the superimposing lens 33a. The superimposing lens 33a homogenizes the illuminance distribution of the illumination light WL in the illumination target area in cooperation with the integrator optical system 31. The illumination device 2 generates the illumination light WL as the white light in such a manner as described above.

The configuration of the wavelength conversion element 40 will hereinafter be described.

Figure 3:
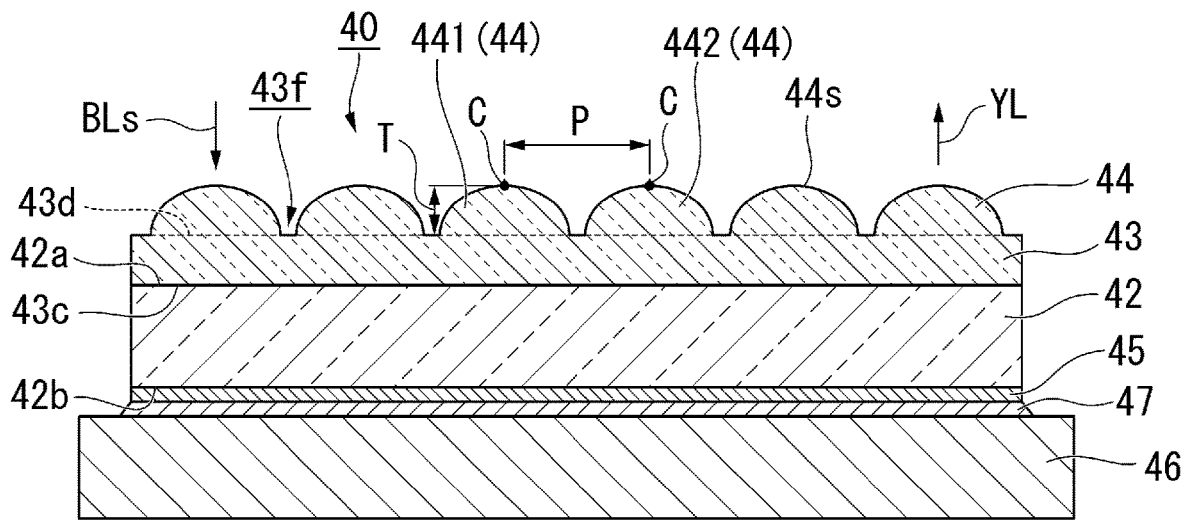
FIG. 3 is a cross-sectional view of a wavelength conversion element according to the first embodiment.

FIG. 3 is a cross-sectional view of the wavelength conversion element 40 according to the present embodiment.

As shown in FIG. 3, the wavelength conversion element 40 according to the present embodiment is provided with a wavelength conversion layer 42, the substrate part 43, a plurality of protruding parts 44, a reflecting layer 45, a radiation member 46, and a bonding layer 47.

The wavelength conversion layer 42 has a first surface 42a, and a second surface 42b different from the first surface 42a. The wavelength conversion layer 42 includes a ceramic phosphor for converting the blue light beams BLs in the first wavelength band into the fluorescence YL in a second wavelength band different from the first wavelength band.

The second wavelength band is in a range of, for example, 490 through 750 nm, and the fluorescence YL is yellow light including the green light component and the red light component. It should be noted that it is also possible for the wavelength conversion layer 42 to include single-crystal phosphor. The blue light beams BLs enter the wavelength conversion layer 42 from the first surface 42a, and at the same time, the fluorescence YL is emitted from the first surface 42a. The fluorescence YL in the present embodiment corresponds to light in the second wavelength band in the appended claims.

Specifically, the wavelength conversion layer 42 includes, for example, yttrium aluminum garnet (YAG) type phosphor. Citing YAG:Ce including cerium (Ce) as an activator agent as an example, as the wavelength conversion layer 42, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process.

The wavelength conversion layer 42 includes scattering elements no higher than 5% in volume ratio. Specifically, the wavelength conversion layer 42 includes a plurality of air holes functioning as the scattering elements for the light, and the content of the air holes is set to be no higher than 5% in volume ratio with respect to the phosphor constituting the wavelength conversion layer 42. When the content of the scattering element in the wavelength conversion layer 42 becomes higher than 5% in volume ratio, since the refractive index interface between the phosphor and the scattering elements becomes large, the light having entered the wavelength conversion layer 42 becomes easy to be scattered. In contrast, when making the content of the scattering element in the wavelength conversion layer 42 no higher than 5% in volume ratio, it is possible to sufficiently suppress the scattering of the light having entered the wavelength conversion layer 42. The content of the scattering element in the wavelength conversion layer 42 is more preferably set no higher than 1%, and is further more preferably set no higher than 0.1%. It should be noted that the scattering elements are not limited to the air holes, but can also be particles made of a material having a refractive index different from the refractive index of the phosphor.

The substrate part 43 is disposed so as to have contact with the first surface 42a of the wavelength conversion layer 42. The substrate part 43 is formed of a plate material having predetermined thickness. The substrate part 43 has a third surface 43c having contact with the first surface 42a of the wavelength conversion layer 42, and a fourth surface 43d different from the third surface. It should be noted that as described later, since the substrate part 43 and the protruding parts 44 are integrally formed, the fourth surface 43d is an imaginary surface passing a plurality of planar parts 43f.

The plurality of protruding parts 44 is disposed so as to be opposed to the first surface 42a of the wavelength conversion layer 42 via the substrate part 43. The plurality of protruding parts 44 includes a first protruding part 441 and a second protruding part 442 adjacent to each other. Each of the protruding parts 44 has a convex curve 44s protruding toward the emission direction of the fluorescence YL. Each of the protruding parts 44 has a so-called convex-lens shape.

The plurality of protruding parts 44 is disposed integrally with the substrate part 43 on the fourth surface 43d of the substrate part 43. In other words, the plurality of protruding parts 44 and the substrate part 43 are formed of an integrated member. The plurality of protruding parts 44 and the substrate part 43 are formed of a light transmissive material such as silicon carbide (4H—SiC) having a crystal structure of 4H-type, or sapphire. It is desirable for the refractive index of the constituent material of the plurality of protruding parts 44 and the substrate part 43 to be equal to the refractive index of the wavelength conversion layer 42, or approximate to the refractive index of the wavelength conversion layer 42.

In the present embodiment, a distance from the fourth surface 43d of the substrate part 43 to a vertex C of the convex curve 44s of each of the protruding parts 44 is defined as a height T of the protruding part 44. Further, a distance between the vertex C of the first protruding part 441 and the vertex C of the second protruding part 442 in a direction along the first surface 42a of the wavelength conversion layer 42 is defined as a pitch P of the protruding parts 44. In the present embodiment, the distance between the vertexes C of a plurality of protruding parts 44 in the direction along the first surface 42a, namely the pitch P, is constant.

In the wavelength conversion element 40 according to the present embodiment, the height T of the protruding part 44 is no smaller than 1 µm. The pitch P of the protruding parts 44 is no smaller than 3 µm. Further, among the protruding parts 44, the pitch P of the two protruding parts 44 adjacent to each other is constant irrespective of the places. In other words, the plurality of protruding parts 44 is formed at an equal pitch P throughout the entire area of the first surface 42a of the wavelength conversion layer 42. The first protruding part 441 and the second protruding part 442 are disposed at a distance in a direction along the fourth surface 43d of the substrate part 43. Thus, the fourth surface 43d has the planar part 43f between the first protruding part 441 and the second protruding part 442.

The reflecting layer 45 is disposed between the second surface 42b of the wavelength conversion layer 42 and the bonding layer 47. The reflecting layer 45 reflects the blur light beams BLs having entered the wavelength conversion layer 42 and the fluorescence YL generated in the wavelength conversion layer 42. The reflecting layer 45 is formed of a metal material relatively high in reflectance such as silver (Ag), or a dielectric multilayer film. It should be noted that it is also possible to dispose a protective layer, a bonding auxiliary layer, an adhesive layer, or the like in addition to the reflecting layer 45 making a substantive contribution to the reflection of the light.

The radiation member 46 is formed of a material high in thermal conductivity and excellent in radiation performance. Specifically, the radiation member 46 is formed of a metal material such as copper or aluminum, or a ceramics material such as aluminum nitride, alumina, sapphire, or diamond. The radiation member 46 receives the heat generated in the wavelength conversion layer 42 when being irradiated with the blue light beams BLs, and then releases the heat to the outside. It should be noted that it is possible to dispose a fin or the like for facilitating the radiation on a surface at the opposite side to a surface of the radiation member 46 on which the wavelength conversion layer 42 is disposed.

The bonding layer 47 is disposed between the reflecting layer 45 and the radiation member 46 to bond the reflecting layer 45 and the radiation member 46 to each other. It is desirable to use a material high in thermal conductivity for the bonding layer 47, and there is used, for example, a silver paste using silver nanoparticles, a gold paste using gold nanoparticles, or a gold-tin solder.

A method of manufacturing the wavelength conversion element 40 according to the present embodiment will hereinafter be described.

FIG. 4A through FIG. 4E are cross-sectional views showing a method of manufacturing the wavelength conversion element 40 according to the present embodiment following the process sequence.

Figure 4A:
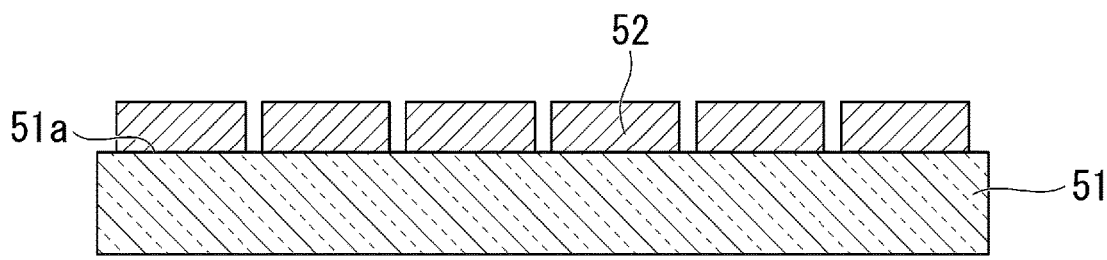
FIG. 4A is a cross-sectional view of a process showing a method of manufacturing the wavelength conversion element according to the first embodiment.

First, as shown in FIG. 4A, after applying a resist to one surface 51a of a transmissive substrate 51 made of 4H-SiC, sapphire, or the like, a resist pattern 52 for forming the plurality of protruding parts 44 is formed using a photolithography technology. On this occasion, the resist pattern 52 is formed to have square shapes with a side of 10 µm when viewed from the normal direction of the one surface 51a of the light transmissive substrate 51, wherein the distance between the patterns adjacent to each other is set to 2 µm, and the thickness of the resist is set to 2.7 µm.

Figure 4B:
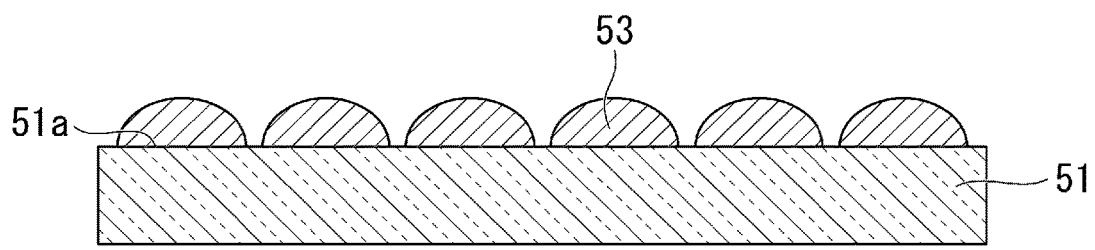
FIG. 4B is a cross-sectional view of a process after the process in FIG. 4A.

Then, the light transmissive substrate 51 provided with the resist pattern 52 is burnt at a temperature at which the resist pattern 52 is not carbonized, for example, a temperature in a range of about 180° C. through 220° C. On this occasion, as shown in FIG. 4B, the resist pattern 52 softens to be reflowed, and then changes into a resist pattern 53 having hemispherical convex-lens shapes due to the surface tension.

Figure 4C:
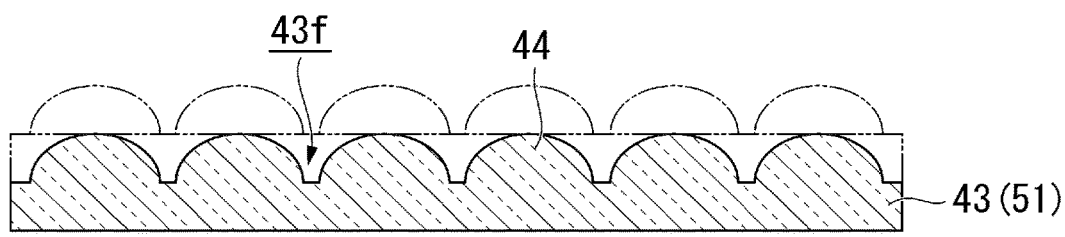
FIG. 4C is a cross-sectional view of a process after the process in FIG. 4B.

Then, using the convex-lens shapes of the resist pattern 53 as a mold, dry etching of the light transmissive substrate 51 is performed using $BCl_3$, chlorine, argon, oxygen, and so on. On this occasion, as shown in FIG. 4C, the convex-lens shapes of the resist pattern 53 are transferred as the convex-lens shapes of the light transmissive substrate 51. Thus, the light transmissive substrate 51 having the substrate part 43 having the planar parts 43f, and the plurality of protruding parts 44 is manufactured. The material such as 4H—SiC or sapphire is suitable as the material of the light transmissive substrate 51 from a viewpoint that etching can be performed with relative ease.

Figure 4D:
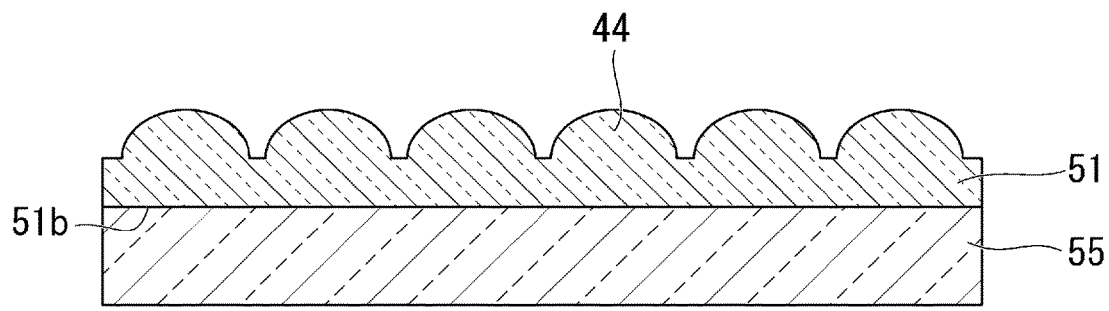
FIG. 4D is a cross-sectional view of a process after the process in FIG. 4C.

Then, as shown in FIG. 4D, a phosphor substrate 55 which is made of YAG, and which is separately manufactured is bonded to another surface 51b of the light transmissive substrate 51 provided with the plurality of protruding parts 44. For the bonding between the light transmissive substrate 51 and the phosphor substrate 55, there can be used, for example, activated bonding. The activated bonding is a technology that sputtering with an inert gas such as argon is performed under high vacuum to thereby cut the surface of each of substrates 51, 55, then covalent bonds are provided to the surface of each of the substrates 51, 55 to thereby activate the surfaces, and thus, the substrates are bonded to each other with the covalent bonding. According to this technology, it is possible to bond the light transmissive substrate 51 and the phosphor substrate 55 to each other without using an adhesive, a bonding material, or the like.

Figure 4E:
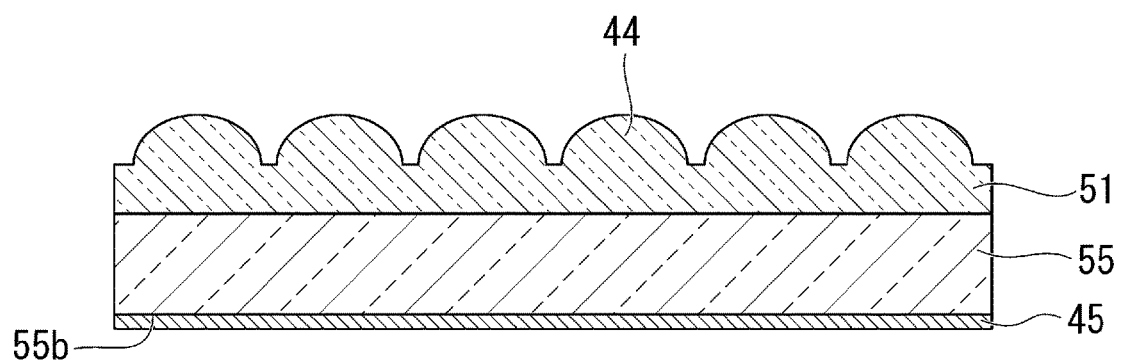
FIG. 4E is a cross-sectional view of a process after the process in FIG. 4D.

Then, as shown in FIG. 4E, the reflecting layer 45 made of metal such as silver is provided to one surface 55b of the phosphor substrate 55 using an evaporation method, a sputtering method, or the like.

Lastly, although not shown in the drawings, the bonded body obtained by bonding the light transmissive substrate 51 and the phosphor substrate 55 to each other is diced into parts having a predetermined size, and then the parts are bonded to the radiation member 46 using the bonding material, and thus, the wavelength conversion element 40 according to the present embodiment is completed.

Function of Wavelength Conversion Element According to First Embodiment

Here, there is assumed a wavelength conversion element according to a comparative example which is not provided with the plurality of protruding parts.

Figure 5:
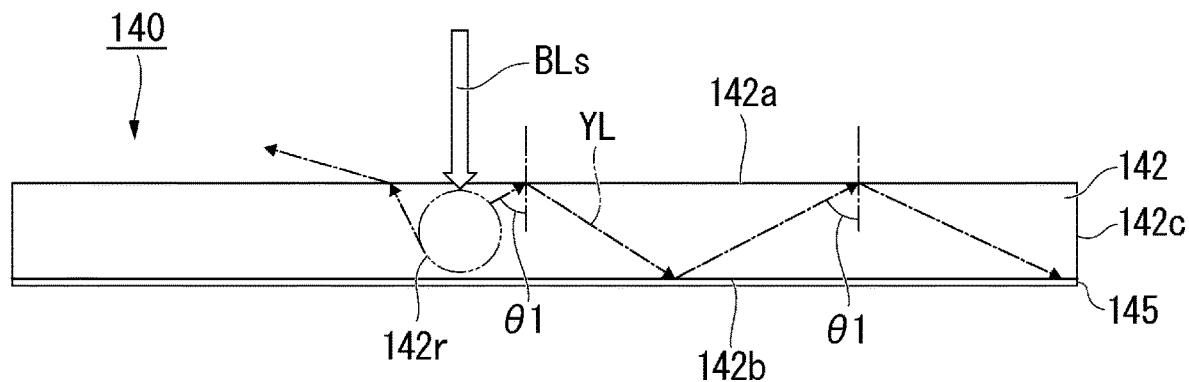
FIG. 5 is a diagram showing a function of a wavelength conversion element according to a comparative example.

FIG. 5 is a diagram showing a function of the wavelength conversion element 140 according to the comparative example.

As shown in FIG. 5, the wavelength conversion element 140 according to the comparative example is provided with a wavelength conversion layer 142 made of YAG, and a reflecting layer 145 provided to a second surface 142b of the wavelength conversion layer 142. It should be noted that the wavelength conversion layer 142 includes scattering elements no higher than 5% in volume ratio.

In the wavelength conversion element 140 according to the comparative example, when the blue light beam BLs enters a first surface 142a of the wavelength conversion layer 142, the critical angle becomes 33.1° assuming the refractive index of YAG constituting the wavelength conversion layer 142 as 1.83. Therefore, the light having entered the interface between the wavelength conversion layer 142 and air at an incident angle θ1 larger than 33.1° is totally reflected.

Here, when the first surface 142a and the second surface 142b of the wavelength conversion layer 142 are parallel to each other, the fluorescence YL generated by a wavelength conversion section 142r reaches an end surface 142c of the wavelength conversion layer 142 without changing the incident angle θ1 when repeating reflection by the first surface 142a and the second surface 142b. On this occasion, the fluorescence YL is emitted from the end surface 142c to the outside, or reflected by the end surface 142c, and is attenuated while proceeding toward the opposite direction and repeating the total reflection. In either case, there is no chance for such fluorescence YL to be emitted from the first surface 142a to the outside. Therefore, the light source device using the wavelength conversion element 140 according to the comparative example small in content volume of the scattering element has a problem that the use efficiency of the fluorescence YL is low.

Figure 6:
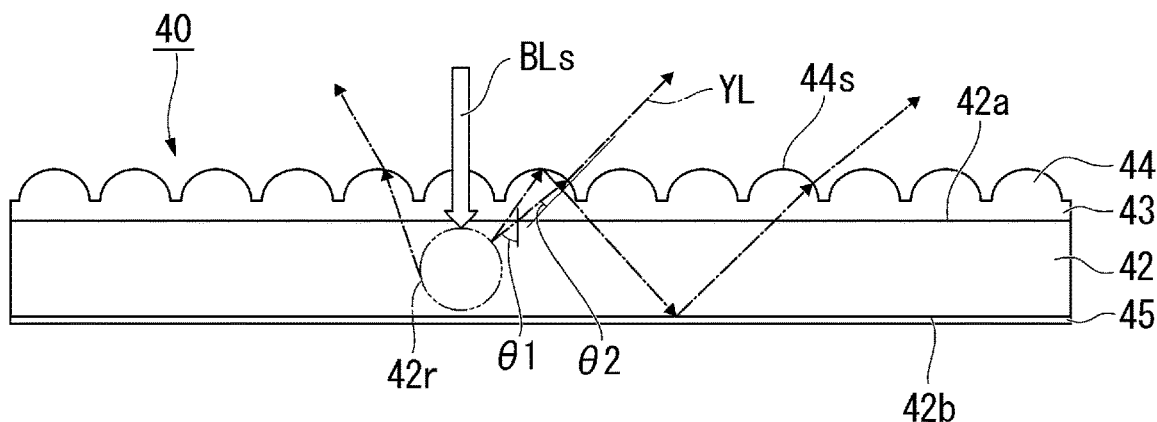
FIG. 6 is a diagram showing a function of the wavelength conversion element according to the first embodiment.

FIG. 6 is a diagram showing a function of the wavelength conversion element 40 according to the present embodiment.

In contrast, in the case of the wavelength conversion element 40 according to the present embodiment, as shown in FIG. 6, the substrate part 43 and the plurality of protruding parts 44 are provided to the first surface 42a of the wavelength conversion layer 42. Here, it is assumed that the refractive index of the constituent material of the substrate part 43 and the plurality of protruding parts 44 is equal to the refractive index of the wavelength conversion layer 42, and the refraction of the light does not occur on the interface between the substrate part 43 and the wavelength conversion layer 42.

In the wavelength conversion element 40 according to the present embodiment, even in the fluorescence YL which is emitted from the wavelength conversion section 42r and then enters the first surface 42a of the wavelength conversion layer 42 at a large incident angle θ1, since the convex curve 44s is tilted with respect to the first surface 42a, and the incident angle θ2 to the convex curve 44s becomes smaller than the critical angle, when the fluorescence YL enters the convex curve 44s, namely the interface between the protruding part 44 and air, the fluorescence YL is emitted to the outside without being totally reflected. Further, the incident angle becomes no smaller than the critical angle, and the fluorescence YL is totally reflected in some cases depending on the place where the fluorescence YL enters out of the convex curve 44s. Even in that case, since the angle of the fluorescence YL changes due to the reflection on the convex curve 44s unlike the wavelength conversion element 140 according to the comparative example in which the first surface 142a and the second surface 142b are parallel to each other, the probability that the fluorescence YL is emitted to the outside without being totally reflected increases when the fluorescence YL is reflected by the second surface 42b and then enters another of the protruding parts 44 once again. As described above, by disposing the plurality of protruding parts 44 at the first surface 42a side of the wavelength conversion layer 42, it is possible to efficiently emit the fluorescence YL to the outside.

Regarding Height and Pitch of Protruding Parts

A result of study by the inventors on the height T and the pitch P of the protruding parts 44 will hereinafter be described.

It is assumed that, for example, a plurality of structures which are smaller than the wavelength of the incident light, and each have a triangular cross-sectional shape is provided to a surface of a light transmissive substrate. In this case, in an upper part of the structure, the refractive index is relatively low since the volume of the structure is relatively small, and the volume of air is relatively large, while in a lower part of the structure, the refractive index is relatively high since the volume of the structure is relatively large, and the volume of air is relatively small. Therefore, for the light entering the plurality of structures from the outside, the plurality of structures is recognized as a refractive index distribution. Therefore, since the refractive index continuously increases from air toward the light transmissive substrate, the Fresnel reflection due to the refractive index difference on the interface hardly occurs. Such a structure is known as an antireflection structure, and is called a photonic structure.

In contrast, focusing attention on the light guided inside the light transmissive substrate, the incident angle of the light having entered the surface of the photonic structure becomes larger as the refractive index decreases from the light transmissive substrate toward the outside. Therefore, the light which has entered the interface between the light transmissive substrate and air at an angle larger than the total reflection angle when the photonic structure does not exist also enters the interface between the photonic structure and air at an angle larger than the total reflection angle. Therefore, in the photonic structure, it is unachievable to prevent the internal total reflection of the light. Therefore, even when the photonic structure is added to the wavelength conversion element 140 according to the comparative example described above, it is not possible to resolve the problem that the use efficiency of the fluorescence is low.

Therefore, it is necessary to make the height T of the protruding part 44 larger than the wavelength of the fluorescence YL so that the photonic effect does not occur. In other words, assuming that the wavelength band of the fluorescence YL is shorter than 1000 nm, it is necessary for the height T of the protruding part 44 to be no smaller than 1 μm.

Figure 7:
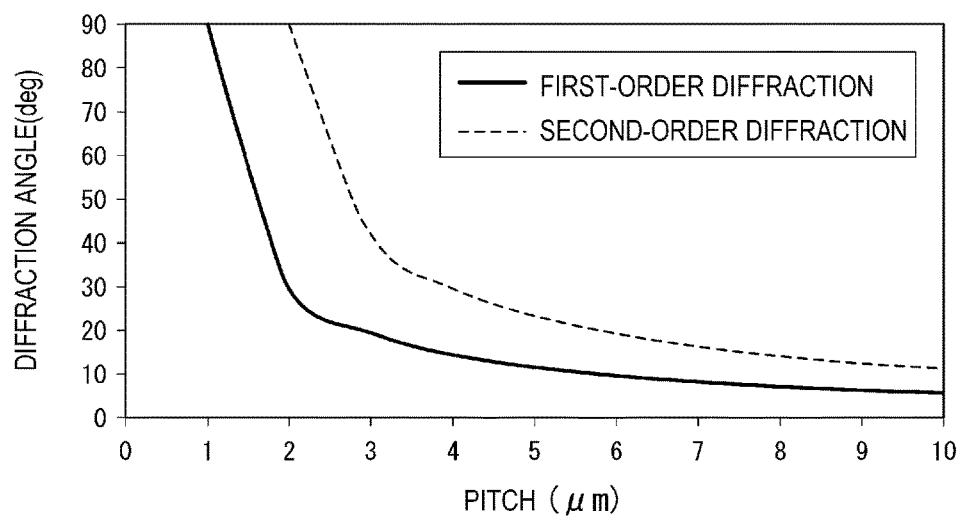
FIG. 7 is a graph showing a relationship between a pitch of protruding parts and a diffraction angle.

FIG. 7 is a graph showing a relationship between the pitch P of the protruding parts 44 and a diffraction angle.

In FIG. 7, the horizontal axis represents the pitch (μm) of the protruding parts 44, and the vertical axis represents the diffraction angle (°). The graph shown in FIG. 7 is calculated from a diffraction formula $d \times \sin \beta = n \times \lambda$ at the incident angle of 0 degrees when defining the pitch as d, the diffraction angle (rad) as β, the diffraction order as n, and the wavelength of the incident light as λ (λ=1000 nm). The graph of the solid line represents the first-order diffraction, and the graph of the dotted line represents the second-order diffraction.

In the wavelength conversion element 40 according to the present embodiment, the plurality of protruding parts 44 constitutes a specific periodic structure. Therefore, depending on the period of the protruding parts 44, it is necessary to take the influence of the diffraction of the light into consideration. As shown in FIG. 7, there is exhibited a tendency that the diffraction of the light increases when the pitch P of the protruding parts 44 reduces to some extent. Specifically, there is exhibited a tendency that the first-order diffraction angle rapidly increases when the pitch P of the protruding parts 44 decreases to a level smaller than 2 μm, and the second-order diffraction angle rapidly increases when the pitch P of the protruding parts 44 decreases to a level smaller than 3 μm. When the diffraction angle becomes large, a decrease in extraction amount of the fluorescence YL from the wavelength conversion layer 42, and by extension, a decrease in use efficiency of the fluorescence YL are incurred, and therefore, it is necessary to make the pitch P of the protruding parts 44 no smaller than 3 μm taking the second-order diffraction into consideration.

Regarding Refractive Index Ratio of Protruding Part to Wavelength Conversion Layer A result of study by the inventors on the refractive index ratio of the protruding parts 44 to the wavelength conversion layer 42 will hereinafter be described. The refractive index ratio of the protruding parts 44 to the wavelength conversion layer 42 is hereinafter referred to simply as a refractive index ratio.

Figure 8:
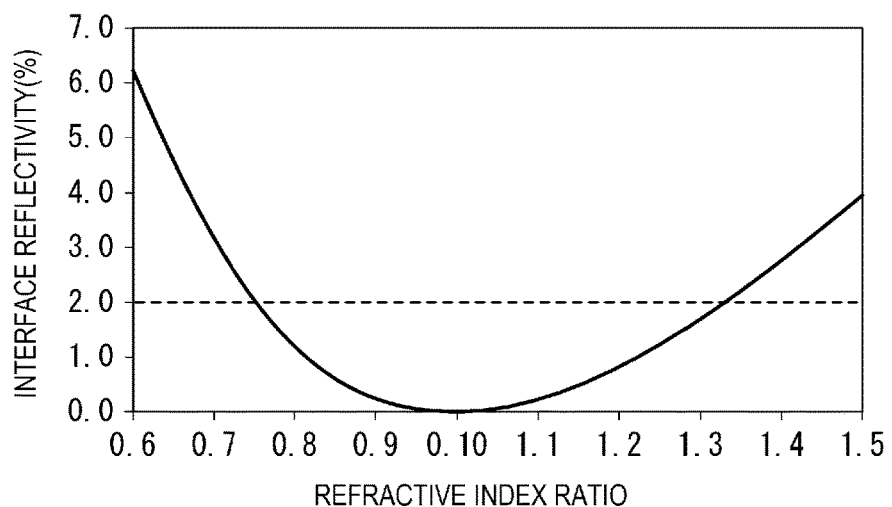
FIG. 8 is a graph showing a relationship between a refractive index ratio and interface reflectivity of a protruding part with respect to the wavelength conversion layer.

FIG. 8 is a graph showing a relationship between the refractive index ratio and interface reflectivity. In FIG. 8, the horizontal axis represents the refractive index ratio (no unit), and the vertical axis represents the interface reflectivity (%).

Denoting the refractive index ratio by A, the interface reflectivity Ra is calculated from the formula (1) described below derived from the formula for Fresnel reflection.

$$Ra=(1-A)^2/(1+A)^2 \quad (1)$$

The refractive index ratio is defined as a value obtained by dividing the refractive index of the protruding part 44 by the refractive index of the wavelength conversion layer 42. In other words, when defining the refractive index of the protruding part 44 as Nt, and the refractive index of the wavelength conversion layer 42 as Nph, the refractive index ratio A is expressed by the formula (2) described below.

$$A=Nt/Nph \quad (2)$$

It is desirable that the refractive index of the wavelength conversion layer 42 and the refractive index of the substrate part 43 and the protruding part 44 are equal to each other, but when the refractive index of the wavelength conversion layer 42 and the refractive index of the substrate part 43 and the protruding part 44 are different from each other, there occurs interface reflection due to a difference in refractive index on the interface between the wavelength conversion layer 42 and the substrate part 43. When the interface reflection occurs, the blue light beams BLs are reflected before entering the wavelength conversion layer 42 to cause a loss, but cannot make a contribution to the excitation of the phosphor. Taking this point into consideration, it is desirable to select a range of the refractive index ratio in which the interface reflectivity becomes low. As shown in FIG. 8, in an area where the refractive index ratio is lower than 0.75, and an area where the refractive index ratio is higher than 1.30, the interface reflectivity exceeds 2%, and at the same time, exhibits a tendency of rapidly increasing. Therefore, it is desirable for the refractive index ratio to be no lower than 0.75 and no higher than 1.30.

Advantages of First Embodiment

The wavelength conversion element 40 according to the present embodiment is provided with the wavelength conversion layer 42 and the plurality of protruding parts 44, wherein the wavelength conversion layer 42 has the first surface 42a and the second surface 42b different from the first surface 42a, includes the scattering element no higher than 5% in volume ratio, and converts the blue light beams BLs into the fluorescence YL, the plurality of protruding parts 44 is disposed so as to be opposed to the first surface 42a, and includes the first protruding part 441 and the second protruding part 442 adjacent to each other, and the height T of the protruding parts 44 is no smaller than 1 μm and the pitch P of the protruding parts 44 is no smaller than 3 μm.

According to this configuration, by disposing the plurality of protruding parts 44 so as to be opposed to the first surface 42a of the wavelength conversion layer 42, it is possible to efficiently emit the fluorescence YL to the outside. Thus, it is possible to realize the wavelength conversion element 40 excellent in use efficiency of the fluorescence YL. Further, since the wavelength conversion layer 42 has little scattering elements such as the air holes, it is possible to suppress the loss of the blue light beams BLs, and at the same time, it is possible to increase the thermal conductivity of the wavelength conversion layer 42, and thus, it is possible to increase the wavelength conversion efficiency compared to when the wavelength conversion layer 42 has a lot of scattering elements such as the air holes. Further, since the radiation member 46 is provided, a decrease in conversion efficiency due to a rise in temperature of the wavelength conversion layer 42 is small, and therefore, it is possible to realize the wavelength conversion element 40 high in efficiency and high in output at low cost.

In the wavelength conversion layer 40 according to the present embodiment, the value obtained by dividing the refractive index of the protruding part 44 by the refractive index of the wavelength conversion layer 42, namely the refractive index ratio, is no lower than 0.75 and no higher than 1.30.

According to this configuration, it is possible to increase the use efficiency of the blue light beams BLs.

In the wavelength conversion layer 40 according to the present embodiment, the pitch P between the protruding parts 44 in the direction along the first surface 42a is constant.

According to this configuration, it is possible to realize the wavelength conversion element 40 which emits the fluorescence YL having a substantially homogenous intensity distribution.

In the wavelength conversion layer 40 according to the present embodiment, each of the protruding parts 44 has the convex curve 44s protruding toward the emission direction of the fluorescence YL.

According to this configuration, it is possible for the wavelength conversion element 40 to emit the fluorescence YL having the substantially homogenous intensity distribution throughout all directions. Further, when the convex curve 44s is provided, it is easy to deal with when forming a surface treatment film such as an antireflection coat, and it is possible to further increase the conversion efficiency.

In the wavelength conversion element 40 according to the present embodiment, there is disposed the substrate part 43 having the third surface 43c having contact with the first surface 42a of the wavelength conversion layer 42, and the fourth surface 43d different from the third surface 43c, the plurality of protruding parts 44 is disposed integrally with the substrate part 43 on the fourth surface 43d of the substrate part 43, the first protruding part 441 and the second protruding part 442 are disposed at a distance in the direction along the fourth surface 43d, and the fourth surface 43d has the planar part 43f between the first protruding part 441 and the second protruding part 442.

According to this configuration, the thermal stress generated in the substrate part 43 due to the difference in linear expansion coefficient between the wavelength conversion layer 42 and the substrate part 43 can be relaxed with the planar parts 43f. Thus, it is possible to prevent the plurality of protruding parts 44 from being separated from the wavelength conversion layer 42.

The light source device 20 according to the present embodiment is provided with the wavelength conversion element 40 described above, and the light source section 21 for emitting the blue light beams BL.

According to this configuration, it is possible to realize the light source device 20 high in use efficiency of the fluorescence YL.

The projector 1 according to the present embodiment is provided with the light source device 20 described above, the light modulation devices 4B, 4G, and 4R for modulating the light from the light source device 20 in accordance with the image information, and the projection optical device 6 for projecting the light modulated by the light modulation devices 4B, 4G, and 4R.

According to this configuration, it is possible to realize the projector 1 high in efficiency.

Second Embodiment

A second embodiment of the present disclosure will hereinafter be described using FIG. 9 through FIG. 11.

The configurations of a projector and a light source device according to the second embodiment are substantially the same as those in the first embodiment, and the configuration of the wavelength conversion element is different from that of the first embodiment. Therefore, the description of the whole of the projector and the light source device will be omitted.

Figure 9:
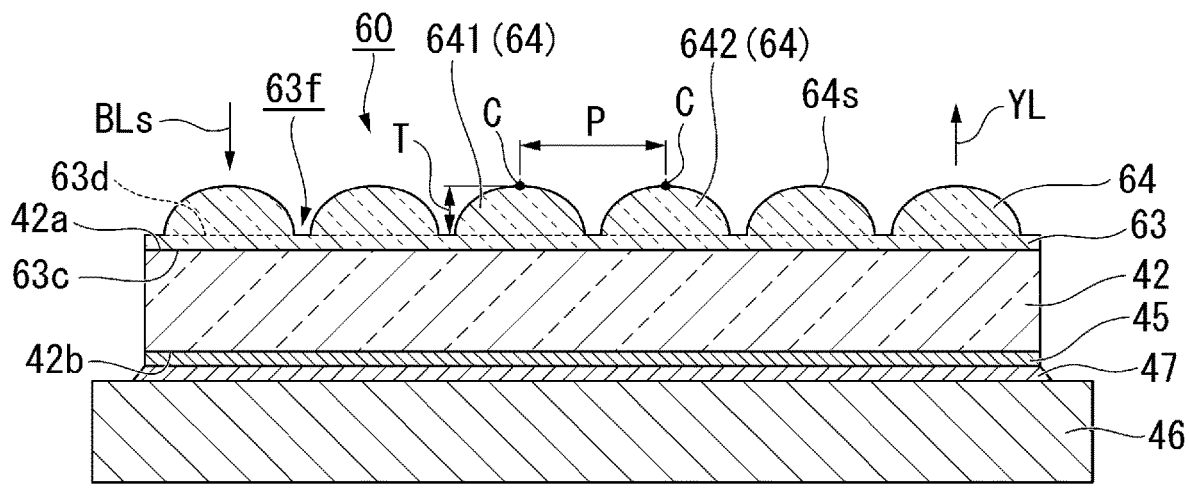
FIG. 9 is a cross-sectional view of a wavelength conversion element according to a second embodiment.

FIG. 9 is a cross-sectional view of a wavelength conversion element 60 according to the second embodiment.

In FIG. 9, the constituents common to the drawing used in the first embodiment are denoted by the same reference symbols, and the description thereof will be omitted.

As shown in FIG. 9, the wavelength conversion element 60 according to the present embodiment is provided with the wavelength conversion layer 42, a substrate part 63, a plurality of protruding parts 64, the reflecting layer 45, the radiation member 46, and the bonding layer 47.

The substrate part 63 is disposed so as to have contact with the first surface 42a of the wavelength conversion layer 42. The substrate part 63 is different from the plate material in the first embodiment, and is formed of a thin film having a predetermined thickness. The substrate part 63 has a third surface 63c having contact with the first surface 42a of the wavelength conversion layer 42, and a fourth surface 63d different from the third surface 63c. It should be noted that since the substrate part 63 and the protruding parts 64 are integrally formed, the fourth surface 63d is an imaginary surface passing a plurality of planar parts 63f.

The plurality of protruding parts 64 is disposed so as to be opposed to the first surface 42a of the wavelength conversion layer 42 via the substrate part 63. The plurality of protruding parts 64 includes a first protruding part 641 and a second protruding part 642 adjacent to each other. Each of the protruding parts 64 has a convex curve 64s protruding toward the emission direction of the fluorescence YL. Further, the first protruding part 641 and the second protruding part 642 are disposed at a distance in a direction along the fourth surface 63d of the substrate part 63. Thus, the fourth surface 63d has the planar part 63f between the first protruding part 641 and the second protruding part 642.

The plurality of protruding parts 64 is disposed integrally with the substrate part 63 on the fourth surface 63d of the substrate part 63. In other words, the plurality of protruding parts 64 and the substrate part 63 are formed of an integrated member. The plurality of protruding parts 64 and the substrate part 63 are formed of a material having a light transmissive property such as a silicon oxynitride (SiON) film, an aluminum oxide film, or a zirconium oxide film. From a viewpoint that microfabrication thereof is easy, it is desirable to use the silicon oxynitride film. It is preferable for the refractive index of the constituent material of the plurality of protruding parts 64 and the substrate part 63 to be equal to the refractive index of the wavelength conversion layer 42, or approximate to the refractive index of the wavelength conversion layer 42.

The rest of the configuration of the wavelength conversion element 60 is substantially the same as that of the wavelength conversion element 40 according to the first embodiment.

A method of manufacturing the wavelength conversion element 60 according to the present embodiment will hereinafter be described.

FIG. 10A through FIG. 10E are cross-sectional views showing a method of manufacturing the wavelength conversion element 60 according to the present embodiment following the process sequence.

Figure 10A:
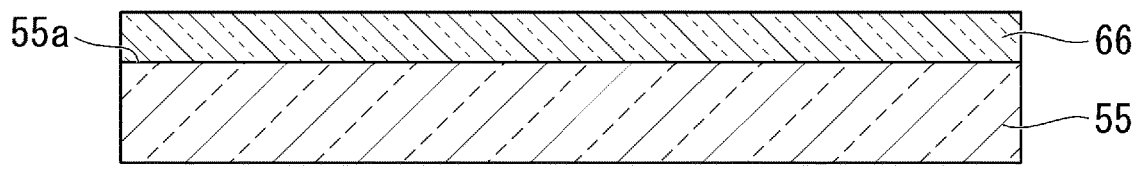
FIG. 10A is a cross-sectional view of a process showing a method of manufacturing the wavelength conversion element according to the second embodiment.

First, as shown in FIG. 10A, the first surface 55a of the phosphor substrate 55 made of YAG or the like is provided with a silicon oxynitride (SiON) film 66. On this occasion, the SiON film 66 is deposited using the CVD method. Using $SiH_4$ as a principal raw-material gas, the concentration ratio between oxygen and nitrogen in the SiON film 66 can be changed in accordance with the ratio between the flow rate of an oxygen or oxygen compound gas for controlling the oxygen concentration in the SiON film 66 and the flow rate of a nitrogen or nitrogen compound gas such as an ammonium gas or $N_2O$ gas for controlling the nitrogen concentration in the SiON film 66. By controlling the concentration ratio between oxygen and nitrogen, it is possible to change the refractive index from about 1.46 to about 2.0. Thus, it is possible to adjust the refractive index of the SiON film 66 to an optimum value. The SiON film 66 can easily be manufactured or processed using an apparatus and a raw material generally used in semiconductor manufacturing.

Figure 10B:
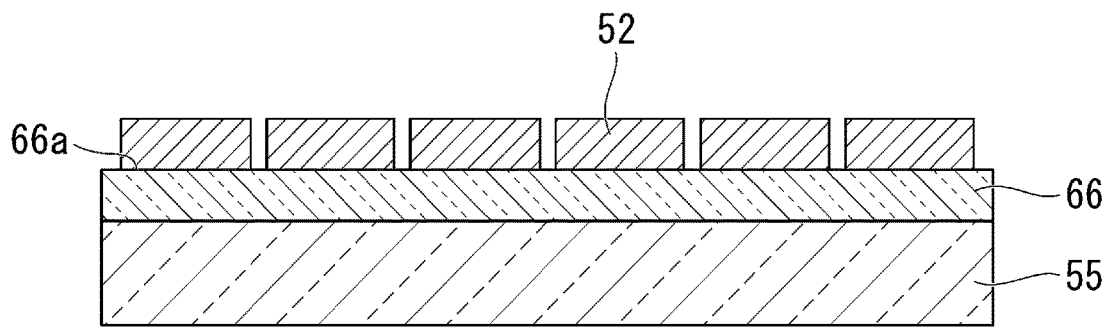
FIG. 10B is a cross-sectional view of a process after the process in FIG. 10A.

Then, as shown in FIG. 10B, after applying a resist to a first surface 66a of the SiON film 66, the resist pattern 52 for forming the plurality of protruding parts 64 is formed using a photolithography technology. On this occasion, the resist pattern 52 is formed to have square shapes with a side of 12 µm when viewed from the normal direction of the first surface 66a, wherein the distance between the patterns adjacent to each other is set to 3 µm, and the thickness of the resist is set to 2.7 µm.

Figure 10C:
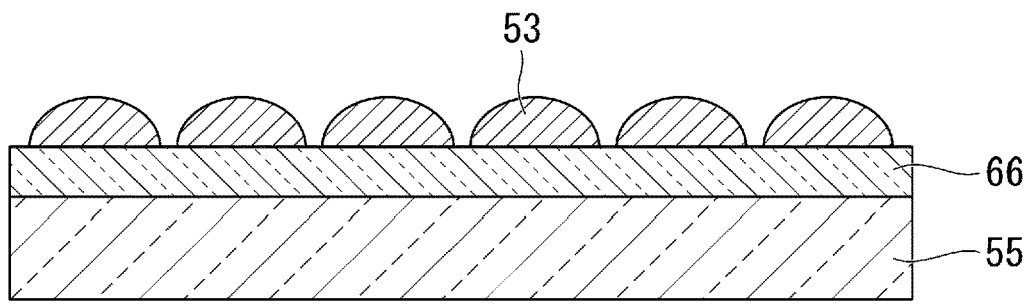
FIG. 10C is a cross-sectional view of a process after the process in FIG. 10B.

Then, the phosphor substrate 55 provided with the resist pattern 52 is burnt at a temperature at which the resist pattern 52 is not carbonized, for example, a temperature in a range of about 180° C. through 220° C. On this occasion, as shown in FIG. 10C, the resist pattern 52 softens to be reflowed, and then changes into a resist pattern 53 having hemispherical convex-lens shapes due to the surface tension.

Figure 10D:
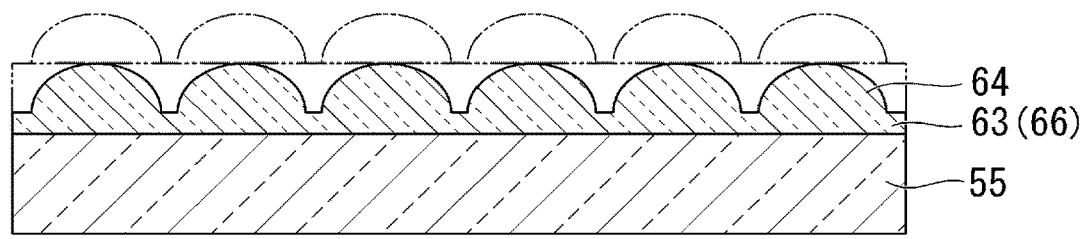
FIG. 10D is a cross-sectional view of a process after the process in FIG. 10C.

Then, using the convex-lens shapes made of the resist pattern 53 as a mold, dry etching of the SiON film 66 is performed using $CF_4$, argon, oxygen, and so on. On this occasion, as shown in FIG. 10D, the convex-lens shapes of the resist pattern 53 are transferred as the convex-lens shapes of the SiON film 66. Thus, the SiON film 66 having the substrate part 63 and the plurality of protruding parts 64 is manufactured.

Figure 10E:
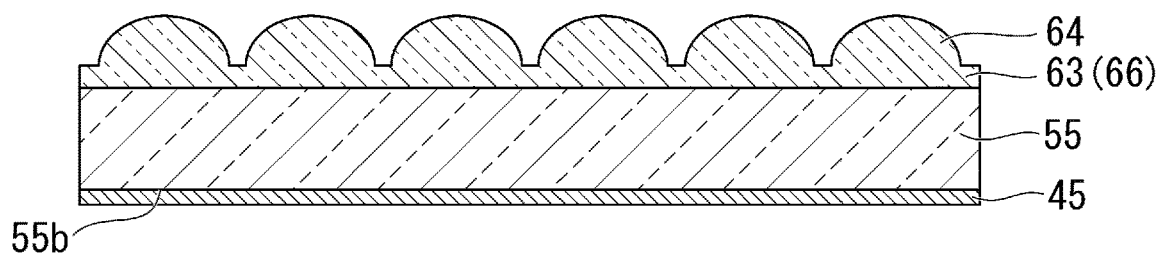
FIG. 10E is a cross-sectional view of a process after the process in FIG. 10D.

Then, as shown in FIG. 10E, the reflecting layer 45 made of metal such as silver is provided to a second surface 55b of the phosphor substrate 55 using an evaporation method, a sputtering method, or the like.

Lastly, the phosphor substrate 55 is diced into parts having a predetermined size, and then the parts are bonded to the radiation member 46 using the bonding material, and thus, the wavelength conversion element 60 according to the present embodiment is completed.

Figure 11:
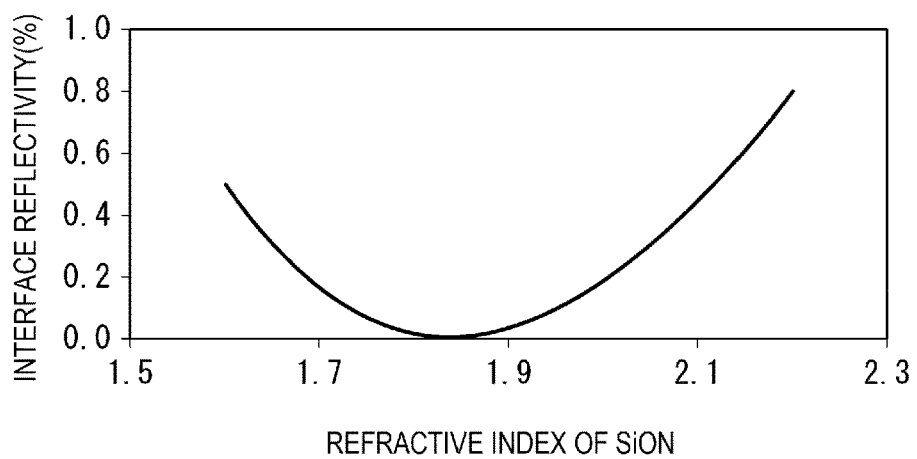
FIG. 11 is a graph showing a relationship between a refractive index and interface reflectivity of a silicon oxynitride film.

FIG. 11 is a graph showing a relationship between the refractive index and the interface reflectivity of the SiON film 66 when using YAG as the wavelength conversion layer 42. In FIG. 11, the horizontal axis represents the refractive index (–) of the SiON film 66, and the vertical axis represents the interface reflectivity (%).

As shown in FIG. 11, when using YAG as the wavelength conversion layer 42, since the refractive index of YAG is 1.83, the interface reflectivity becomes 0% when the refractive index of the SiON film 66 is 1.83, and there is exhibited a tendency that the interface reflectivity increases as the refractive index of the SiON film 66 gets away from 1.83. Therefore, it is desirable to set the refractive index of the SiON film 66 to a value approximate to 1.83 by adjusting the concentration ratio between oxygen and nitrogen in the SiON film 66 as described above.

Advantages of Second Embodiment

Also in the present embodiment, it is possible to obtain substantially the same advantages as those of the first embodiment such as the advantage that it is possible to realize the wavelength conversion element 60 excellent in use efficiency of the fluorescence, the advantage that it is possible to suppress the loss of the excitation light and at the same time it is possible to increase the thermal conductivity of the wavelength conversion layer 42 to thereby increase the wavelength conversion efficiency, and the advantage that it is possible to realize the light source device 20 and the projector 1 high in efficiency.

Further, in the wavelength conversion element 60 according to the present embodiment, the substrate part 63 and the plurality of protruding parts 64 are formed of the thin film 66. Therefore, in the manufacturing process, it is possible to omit the process of bonding the light transmissive substrate and the phosphor substrate to each other which is included in the first embodiment.

Third Embodiment

A third embodiment of the present disclosure will hereinafter be described using FIG. 12.

The configurations of a projector and a light source device according to the third embodiment are substantially the same as those in the first embodiment, and the configuration of the wavelength conversion element is different from that of the first embodiment. Therefore, the description of the whole of the projector and the light source device will be omitted.

Figure 12:
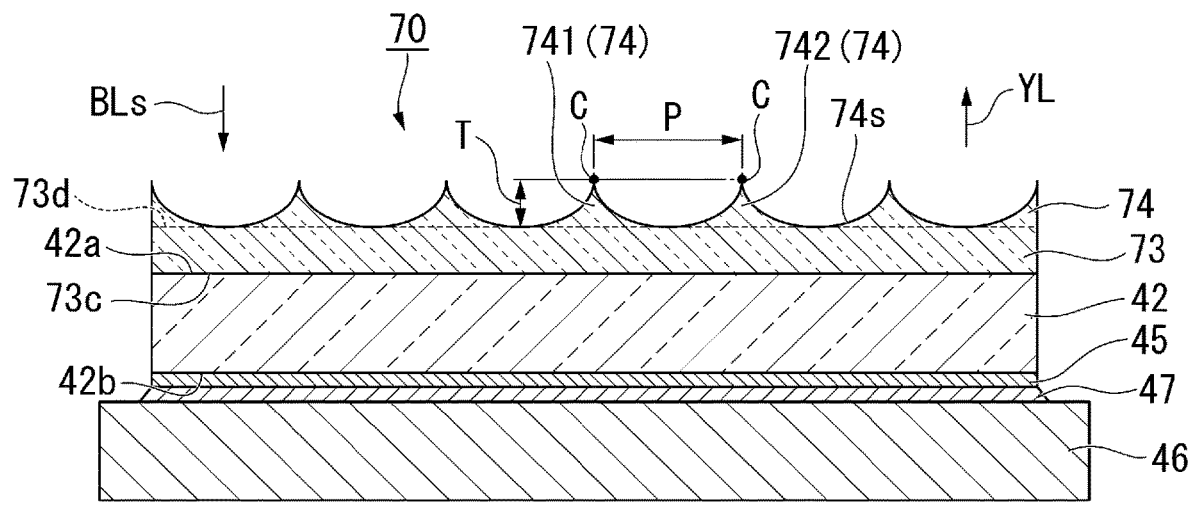
FIG. 12 is a cross-sectional view of a wavelength conversion element according to a third embodiment.

FIG. 12 is a cross-sectional view of the wavelength conversion element according to the third embodiment.

In FIG. 12, the constituents common to the drawing used in the first embodiment are denoted by the same reference symbols, and the description thereof will be omitted.

As shown in FIG. 12, the wavelength conversion element 70 according to the present embodiment is provided with the wavelength conversion layer 42, a substrate part 73, a plurality of protruding parts 74, the reflecting layer 45, the radiation member 46, and the bonding layer 47.

The substrate part 73 is disposed so as to have contact with the first surface 42a of the wavelength conversion layer 42. The substrate part 73 can be formed of the plate material as in the first embodiment, or can also be formed of the thin film as in the second embodiment. The substrate part 73 has a third surface 73c having contact with the first surface 42a of the wavelength conversion layer 42, and a fourth surface 73d different from the third surface 73c. It should be noted that since the substrate part 73 and the protruding parts 74 are integrally formed, the fourth surface 73d is an imaginary surface passing bottom parts of a plurality of concave curves 74s.

The plurality of protruding parts 74 is disposed so as to be opposed to the first surface 42a of the wavelength conversion layer 42 via the substrate part 73. The plurality of protruding parts 74 includes a first protruding part 741 and a second protruding part 742 adjacent to each other. A part of a surface of the first protruding part 741 located close to the second protruding part 742, and a part of a surface of the second protruding part 742 located close to the first protruding part 741 constitute the concave curve 74s recessed toward an opposite direction to the emission direction of the fluorescence YL. In other words, the first protruding part 741 and the second protruding part 742 have the concave curve 74s recessed toward the opposite direction to the emission direction of the fluorescence YL. In other words, the first surface 42a of the wavelength conversion layer 42 is provided with a plurality of concave-lens structures.

In the case of the present embodiment, the planar part is not disposed between the first protruding part 741 and the second protruding part 742 adjacent to each other. A distance from the fourth surface 73d of the substrate part 73 to a vertex of each of the protruding parts 74 where the concave curves 74s adjacent to each other have contact with each other is defined as the height T of the protruding part 74. Further, a distance between the vertex of the first protruding part 741 and the vertex of the second protruding part 742 in a direction along the first surface 42a of the wavelength conversion layer 42 is defined as a pitch P of the protruding parts 74. The distance between the vertexes of the plurality of protruding parts 74 in the direction along the first surface 42a, namely the pitch P, is constant. Further, the height T of the protruding part 74 is no smaller than 1 μm. The pitch P of the protruding parts 74 is no smaller than 3 μm.

The rest of the configuration of the wavelength conversion element 70 is substantially the same as that of the wavelength conversion element 40 according to the first embodiment.

When manufacturing the wavelength conversion element 70 according to the present embodiment, for example, when forming the substrate part 73 and the plurality of protruding parts 74 with the thin film, it is sufficient to manufacture the wavelength conversion element 70 in substantially the same process sequence as in the second embodiment. It should be noted that in the second embodiment, the etch back is performed using the resist pattern 53 as a mask to transfer the hemispherical resist pattern shapes. Unlike the etch back described above, in the present embodiment, it is sufficient to form the plurality of protruding parts 74 by performing isotropic etching on the thin film part other than the resist pattern using the resist pattern 52 having the rectangular cross-sectional shapes as a mask to thereby form the concave curves 74s.

Advantages of Third Embodiment

Also in the present embodiment, it is possible to obtain substantially the same advantages as those of the first embodiment such as the advantage that it is possible to realize the wavelength conversion element 70 excellent in use efficiency of the fluorescence, the advantage that it is possible to suppress the loss of the excitation light and at the same time it is possible to increase the thermal conductivity of the wavelength conversion layer 42 to thereby increase the wavelength conversion efficiency, and the advantage that it is possible to realize the light source device 20 and the projector 1 high in efficiency.

When the first surface 42a of the wavelength conversion layer 42 is provided with the convex-lens shaped structures, there is a possibility that the blue light beams BLs are focused inside the wavelength conversion layer 42 due to the condensing effect of the convex lens, and the wavelength conversion efficiency decreases due to an increase in density of the blue light beams BLs. To deal with this problem, in the wavelength conversion element 70 according to the present embodiment, the first protruding part 741 and the second protruding part 742 have the concave curve 74s recessed toward the opposite direction to the emission direction of the fluorescence YL, and the first surface 42a of the wavelength conversion layer 42 is provided with the concave-lens shaped structures. Therefore, there is no chance for the blue light beams BLs to be focused inside the wavelength conversion layer 42, and thus, it is possible to suppress the decrease in wavelength conversion efficiency due to the increase in density of the blue light beams BLs.

Fourth Embodiment

A fourth embodiment of the present disclosure will hereinafter be described using FIG. 13.

The configurations of a projector and a light source device according to the fourth embodiment are substantially the same as those in the first embodiment, and the configuration of the wavelength conversion element is different from that of the first embodiment. Therefore, the description of the whole of the projector and the light source device will be omitted.

Figure 13:
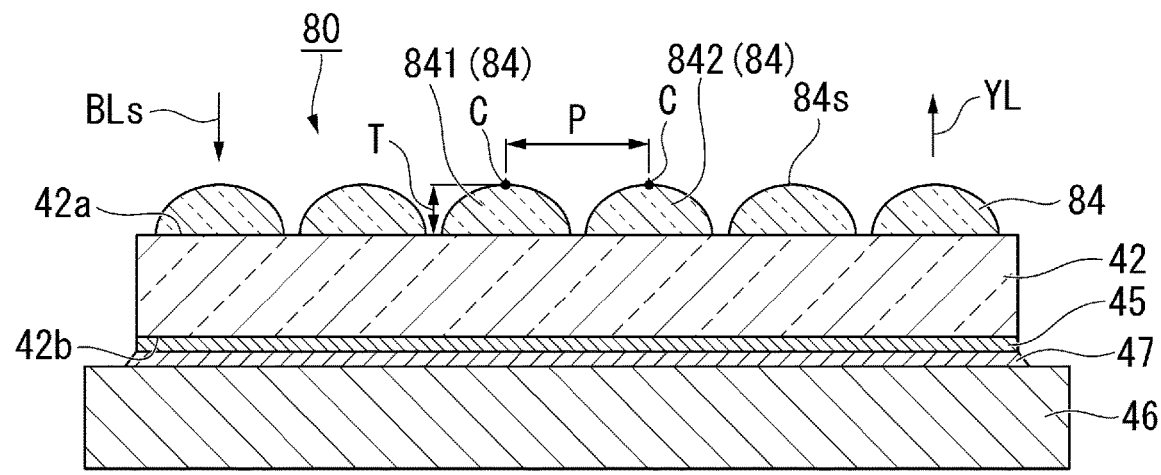
FIG. 13 is a cross-sectional view of a wavelength conversion element according to a fourth embodiment.

FIG. 13 is a cross-sectional view of the wavelength conversion element according to the fourth embodiment.

In FIG. 13, the constituents common to the drawing used in the first embodiment are denoted by the same reference symbols, and the description thereof will be omitted.

As shown in FIG. 13, the wavelength conversion element 80 according to the present embodiment is provided with the wavelength conversion layer 42, a plurality of protruding parts 84, the reflecting layer 45, the radiation member 46, and the bonding layer 47. In other words, the wavelength conversion element 80 according to the present embodiment is not provided with the substrate part unlike the wavelength conversion elements according to the first through third embodiments.

The plurality of protruding parts 84 is disposed so as to have contact with the first surface 42a of the wavelength conversion layer 42. The plurality of protruding parts 84 includes a first protruding part 841 and a second protruding part 842 adjacent to each other. Each of the protruding parts 84 has a convex curve 84s protruding toward the emission direction of the fluorescence YL. The plurality of protruding parts 84 is formed of a material having a light transmissive property such as a silicon oxynitride film, an aluminum oxide film, or a zirconium oxide film. It is preferable for the refractive index of the constituent material of the plurality of protruding parts 84 to be equal to the refractive index of the wavelength conversion layer 42, or approximate to the refractive index of the wavelength conversion layer 42.

In the present embodiment, a distance from the first surface 42a of the wavelength conversion layer 42 to a vertex of a convex curve 84s of each of the protruding parts 84 is defined as a height T of the protruding part 84. Further, a distance between the vertex of the first protruding part 841 and the vertex of the second protruding part 842 in a direction along the first surface 42a of the wavelength conversion layer 42 is defined as a pitch P of the protruding parts 84. In the present embodiment, the distance between the vertexes of the plurality of protruding parts 84 in the direction along the first surface 42a, namely the pitch P, is constant. Further, the height T of the protruding part 84 is no smaller than 1 μm. The pitch P of the protruding parts 84 is no smaller than 3 μm. The first protruding part 841 and the second protruding part 842 are disposed at a distance in a direction along the first surface 42a of the wavelength conversion layer 42.

The rest of the configuration of the wavelength conversion element 80 is substantially the same as that of the wavelength conversion element 40 according to the first embodiment.

When manufacturing the wavelength conversion element 80, it is sufficient to manufacture the wavelength conversion element 80 in substantially the same process sequence as in the second embodiment. It should be noted that while the etching of the SiON film 66 is performed so that the substrate part 63 remains in the second embodiment, it is sufficient to perform the etching of the SiON film 66 in the present embodiment so that the substrate part does not remain, but a part of the first surface 42a of the wavelength conversion layer 42 is exposed.

Advantages of Fourth Embodiment

Also in the present embodiment, it is possible to obtain substantially the same advantages as those of the first embodiment such as the advantage that it is possible to realize the wavelength conversion element 80 excellent in use efficiency of the fluorescence YL, the advantage that it is possible to suppress the loss of the excitation light and at the same time it is possible to increase the thermal conductivity of the wavelength conversion layer 42 to thereby increase the wavelength conversion efficiency, and the advantage that it is possible to realize the light source device 20 and the projector 1 high in efficiency.

It should be noted that the scope of the present disclosure is not limited to the embodiments described above, but a variety of modifications can be provided thereto within the scope or the spirit of the present disclosure.

For example, although in the embodiments described above, there is cited the example of the plurality of protruding parts each having the convex curve or the concave curve, it is possible for the plurality of protruding parts to have a polygonal pyramid shape such as a quadrangular pyramidal shape or a triangular pyramidal shape instead of such a convex-lens shape or a concave-lens shape.

Further, in the embodiments described above, there is cited an example of the stationary wavelength conversion element which is not made rotatable, but the present disclosure can also be applied to a light source device having a wavelength conversion element which is made rotatable using a motor.

Besides the above, the specific descriptions of the shape, the number, the arrangement, the material, and so on of each of the constituents of the wavelength conversion element, the light source device, and the projector are not limited to those of the embodiments described above, but can properly be modified. Although in the embodiments described above, there is described the example of installing the light source device according to the present disclosure in the projector using the liquid crystal light valves, the example is not a limitation. The light source device according to the present disclosure can also be applied to a projector using digital micromirror devices as the light modulation devices. Further, the projector is not required to have a plurality of light modulation devices, and can be provided with just one light modulation device.

Although in the embodiments described above, there is described the example of applying the light source device according to the present disclosure to the projector, the example is not a limitation. The light source device according to the present disclosure can also be applied to lighting equipment, a headlight of a vehicle, and so on.

It is also possible for the wavelength conversion element according to an aspect of the present disclosure to have the following configuration.

The wavelength conversion element according to an aspect of the present disclosure includes a wavelength conversion layer which has a first surface and a second surface different from the first surface, and which includes a scattering element no higher than 5% in volume ratio, and which is configured to convert light in a first wavelength band into light in a second wavelength band different from the first wavelength band, and a plurality of protruding parts which is disposed so as to be opposed to the first surface, and which includes a first protruding part and a second protruding part adjacent to each other, wherein a height of the plurality of protruding parts is no smaller than 1 µm, and a distance between a vertex of the first protruding part and a vertex of the second protruding part in a direction along the first surface is no smaller than 3 µm.

In the wavelength conversion element according to the aspect of the present disclosure, a value obtained by dividing a refractive index of the plurality of protruding parts by a refractive index of the wavelength conversion layer may be no lower than 0.75 and no higher than 1.30.

In the wavelength conversion element according to the aspect of the present disclosure, a distance between the vertexes of the plurality of protruding parts in the direction along the first surface may be constant.

In the wavelength conversion element according to the aspect of the present disclosure, each of the protruding parts may have a convex curve protruding toward an emission direction of the light in the second wavelength band.

In the wavelength conversion element according to the aspect of the present disclosure, there may further be included a substrate part having a third surface having contact with the first surface of the wavelength conversion layer, and a fourth surface different from the third surface, wherein the plurality of protruding parts may integrally be disposed with the substrate part on the fourth surface of the substrate part, the first protruding part and the second protruding part may be disposed at a distance in a direction along the fourth surface, and the fourth surface may have a planar part between the first protruding part and the second protruding part.

In the wavelength conversion element according to the aspect of the present disclosure, the first protruding part and the second protruding part may have a concave curve recessed toward an opposite direction to the emission direction of the light in the second wavelength band.

It is also possible for the light source device according to another aspect of the present disclosure to have the following configuration.

The light source device according to the aspect of the present disclosure includes the wavelength conversion element according to the aspect of the present disclosure, and a light source configured to emit the light in the first wavelength band.

It is also possible for the projector according to another aspect of the present disclosure to have the following configuration.

The projector according to another aspect of the present disclosure includes the light source device according to the aspect of the present disclosure, a light modulation device configured to modulate light from the light source device in accordance with image information, and a projection optical device configured to project the light modulated by the light modulation device.

What is claimed is:

1. A wavelength conversion element comprising:
    a wavelength conversion layer which has a first surface and a second surface different from the first surface, and which includes a scattering element no higher than 5% in volume ratio, and which is configured to convert light in a first wavelength band into light in a second wavelength band different from the first wavelength band; and
    a plurality of protruding parts which is disposed so as to be opposed to the first surface, and which includes a first protruding part and a second protruding part adjacent to each other, wherein
    a height of the plurality of protruding parts is no smaller than 1 µm, and
    a distance between a vertex of the first protruding part and a vertex of the second protruding part in a direction along the first surface is no smaller than 3 µm.

2. The wavelength conversion element according to claim 1, wherein
    a value obtained by dividing a refractive index of the plurality of protruding parts by a refractive index of the wavelength conversion layer is no lower than 0.75 and no higher than 1.30.

3. The wavelength conversion element according to claim 1, wherein
    a distance between the vertexes of the plurality of protruding parts in the direction along the first surface is constant.

4. The wavelength conversion element according to claim 1, wherein
    each of the protruding parts has a convex curve protruding toward an emission direction of the light in the second wavelength band.

5. The wavelength conversion element according to claim 4, further comprising:
    a substrate part having a third surface having contact with the first surface of the wavelength conversion layer, and a fourth surface different from the third surface, wherein the plurality of protruding parts is integrally disposed with the substrate part on the fourth surface of the substrate part, the first protruding part and the second protruding part are disposed at a distance in a direction along the fourth surface, and the fourth surface has a planar part between the first protruding part and the second protruding part.

6. The wavelength conversion element according to claim 1, wherein the first protruding part and the second protruding part have a concave curve recessed toward an opposite direction to the emission direction of the light in the second wavelength band.

7. A light source device comprising:

the wavelength conversion element according to claim 1; and a light source configured to emit the light in the first wavelength band.

8. A projector comprising:

the light source device according to claim 7;

a light modulation device configured to modulate light from the light source device in accordance with image information; and a projection optical device configured to project the light modulated by the light modulation device.

\* \* \* \* \*